(12) United States Patent
Sharp, Jr.

(10) Patent No.: US 9,382,896 B1
(45) Date of Patent: Jul. 5, 2016

(54) ELECTRICAL GENERATING DEVICE

(71) Applicant: James Bert Sharp, Jr., Dallas, TX (US)

(72) Inventor: James Bert Sharp, Jr., Dallas, TX (US)

(*) Notice: Subject to any disclaimer, the term of this patent is extended or adjusted under 35 U.S.C. 154(b) by 213 days.

(21) Appl. No.: 13/775,093

(22) Filed: Feb. 22, 2013

Related U.S. Application Data

(60) Provisional application No. 61/633,966, filed on Feb. 22, 2012.

(51) Int. Cl.
*G08B 17/00* (2006.01)
*F03D 1/00* (2006.01)

(52) U.S. Cl.
CPC .......................... *F03D 1/00* (2013.01)

(58) Field of Classification Search
CPC ...... G08B 17/10; G08B 17/107; G08B 17/11; G08B 21/14; G08B 21/182; G08B 29/185; G08B 3/10
USPC .................................... 290/55; 340/627–630
See application file for complete search history.

(56) References Cited

U.S. PATENT DOCUMENTS

| | | | | |
|---|---|---|---|---|
| 6,352,473 B1* | 3/2002 | Clark | ...................... | F23L 17/10 454/18 |
| 2001/0035716 A1* | 11/2001 | Murasko | ................ | H05B 33/10 313/510 |
| 2004/0201565 A1* | 10/2004 | Cunningham et al. | ........ | 345/102 |
| 2006/0187017 A1* | 8/2006 | Kulesz | ................... | G08B 21/12 340/506 |
| 2007/0008104 A1* | 1/2007 | McBain | ................. | G08B 23/00 340/517 |
| 2007/0291473 A1* | 12/2007 | Traynor | ........................ | 362/106 |
| 2009/0174566 A1* | 7/2009 | Volk et al. | ................... | 340/691.5 |
| 2011/0021134 A1* | 1/2011 | Zwern | ....................... | C02F 1/04 454/343 |
| 2012/0050030 A1* | 3/2012 | Murphy | ............... | G08B 29/145 340/514 |

* cited by examiner

*Primary Examiner* — George Bugg
*Assistant Examiner* — Sharmin Akhter
(74) *Attorney, Agent, or Firm* — Kenneth L. Tolar

(57) ABSTRACT

An electrical generating device for creating supplemental electrical power includes a turbine attic ventilator that drives a generator. The generator is electrically connected to a rechargeable battery and a main power grid. The battery powers an optical smoke detector that activates an audible and/or visual alarm whenever particulate smoke is detected. Accordingly, as the ventilator is rotated by wind, the battery is recharged and the main power grid is supplemented.

7 Claims, 2 Drawing Sheets

ELECTRICAL GENERATING DEVICE

CROSS REFERENCE TO RELATED APPLICATIONS

This application is entitled to the benefit of provisional patent application No. 61/633,966 filed on Feb. 22, 2012, the specification of which is incorporated herein by reference.

BACKGROUND OF THE INVENTION

The present invention relates to a device for generating electricity using attic ventilators.

DESCRIPTION OF THE PRIOR ART

Most dwellings include one or more turbine ventilators, which remove hot air from an attic so that it may be replaced with cooler, ambient air that enters soffit vents. Most turbine ventilators are powered by wind forces and, therefore, conserve valuable electricity. However, much of the resulting energy provided by the wind is wasted and underutilized. Accordingly, there is currently a need for a device that converts wasted energy from an attic ventilator to a useful resource. The present invention satisfies this need by providing an electrical generator coupled with a turbine ventilator for supplementing a main power grid.

SUMMARY OF THE INVENTION

The present invention relates to an electrical generating device for creating supplemental electrical power within a dwelling including a turbine attic ventilator that drives a generator. The generator is electrically connected to a battery that powers a smoke detector, and a main power grid within a dwelling. The smoke detector activates an audible and/or visual alarm whenever particulate smoke is detected near the ventilator. Accordingly, as the ventilator is rotated by wind, the battery is recharged and the main power grid is supplemented.

It is an object of the present invention to provide a device that produces supplemental electricity using an attic ventilator.

It is another object of the present invention to provide an attic ventilator that powers a smoke detector.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
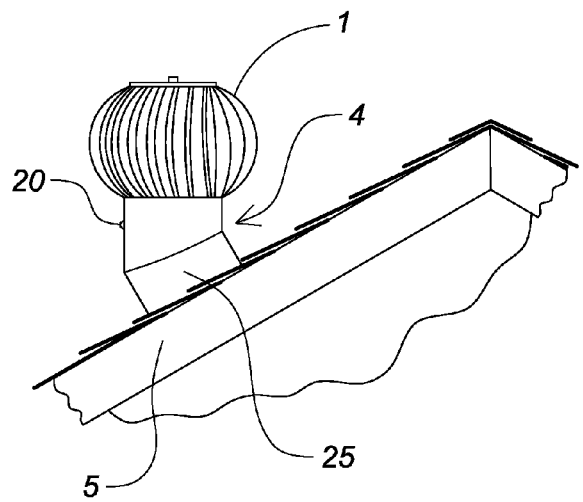
FIG. 1 depicts the attic ventilator according to the present invention installed on a roof.
Figure 2:
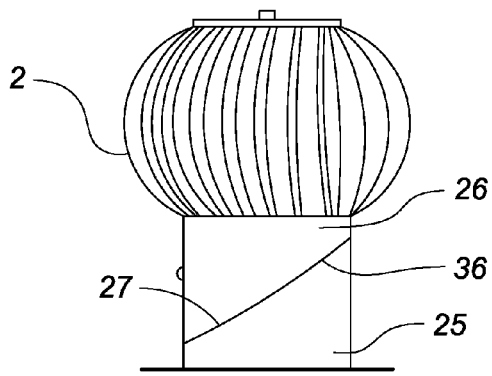
FIG. 2 is an isolated view of the attic ventilator.
Figure 3:
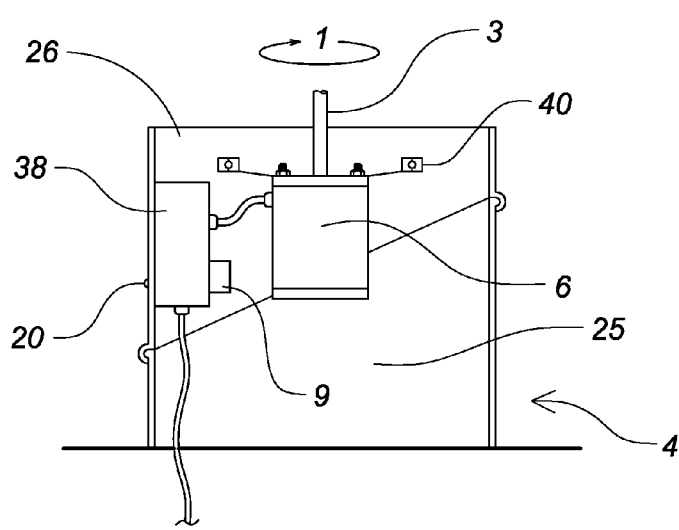
FIG. 3 is a sectional view of the conduit.
Figure 4:
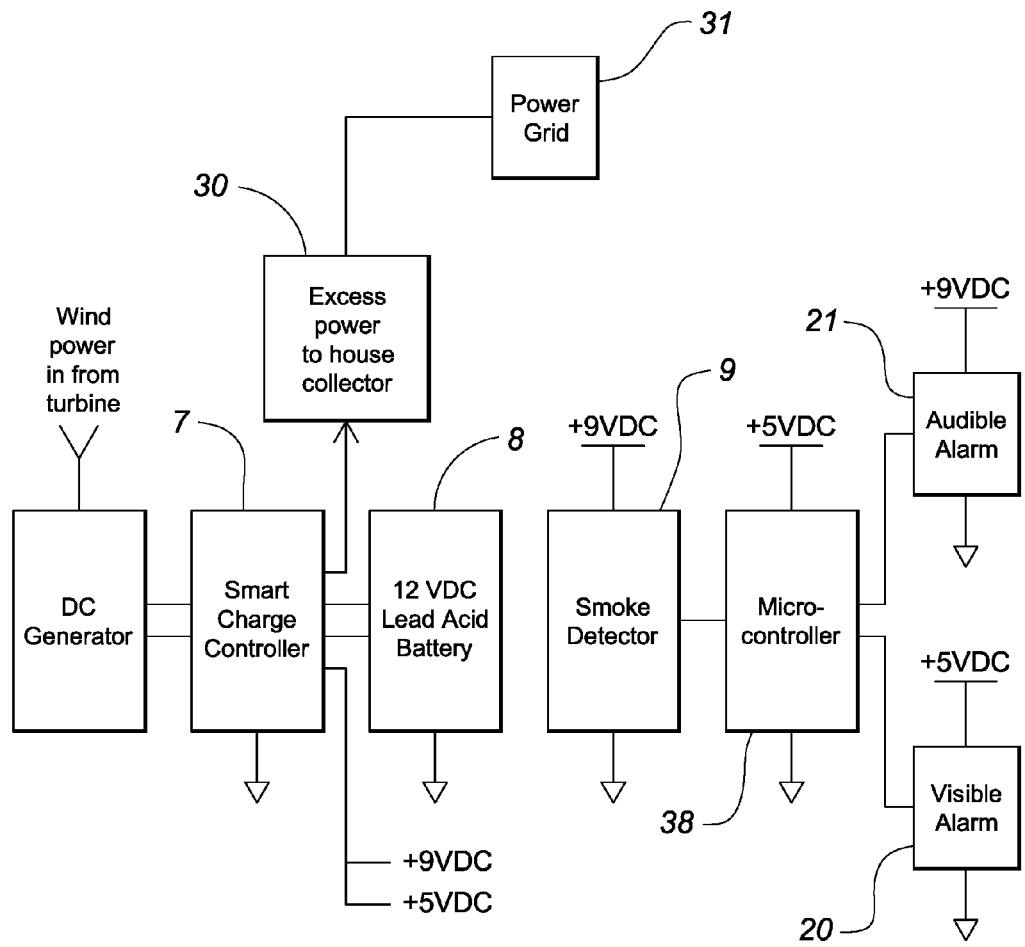
FIG. 4 is a schematic of the energy-producing components according to the present invention.

The present invention relates to a device for generating supplemental electrical power including a turbine attic ventilator 1 formed of a vaned or bladed shroud 2 mounted on a rotary drive shaft 3 that forms part of a permanent-magnet electrical generator 6. The shroud is superimposed on a conduit 4 that is mounted on a roof 5 and which is in communication with an attic. The conduit is formed of a lower, base section 25 and a rotating upper section 26. The base section 25 includes a chamfered upper edge 36 that mates with a chamfered lower edge 27 on the upper section 26; accordingly, when the upper section is rotated, the angle of the shroud relative to the roof changes, allowing a user to optimally position the shroud relative to current wind direction.

The generator 6 is received within the conduit and is fastened to the upper section 26 with brackets 40. The generator produces electricity in response to rotation of the shroud and drive shaft in a conventional fashion. The generator 6 is electrically connected to a smart-charge controller 7 that recharges a battery 8 upon receiving a sufficient current from the generator. The battery powers an optical smoke detector 9 protruding into the conduit that activates an audible 21 and/or visual alarm 20 whenever particulate smoke is detected. Accordingly, smoldering fires within the dwelling can be detected as smoke spreads to the attic and is diverted to the atmosphere by the ventilator. The visual alarm could be LED's positioned on a side or an end of the conduit, or a programmable OLED sign wrapped thereabout. An auxiliary computer and wireless data link can be used to program the OLED's. The conduit may also include a camera mounted thereon that is in wireless communication with an auxiliary monitor. The camera allows an occupant to conveniently monitor the dwelling perimeter. The alarms 20, 21 and their associated microcontroller 38 are powered by the smart-charge controller.

The smart-charge controller is also electrically connected to a collector 30 (i.e., a group of rechargeable batteries) that is in communication with the dwelling's main power grid 31; any excess electricity produced by the generator, above that which is needed to recharge the battery, is diverted to the collector to supplement the dwelling's main power supply once the battery has been fully charged.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a building having a roof with an attic below, a device for generating electricity comprising:
    a turbine attic ventilator mounted on said roof, said ventilator formed of a bladed shroud with a drive shaft attached thereto, said shroud superimposed on a conduit that is mounted on a roof and which is in communication with said attic, said shroud freely rotatable by wind to remove hot air from said attic;
    an electrical generator received within said conduit and coupled with said drive shaft whereby rotation of said shroud and said shaft generates electricity;
    a source in communication with said generator for receiving electricity created thereby;
    a smart-charge controller;
    a rechargeable battery connected to said smart-charge controller;
    an optical smoke detector within said conduit and connected to said battery;
    an alarm in communication with said smoke detector for alerting a user of the presence of smoke;

wherein said alarm is a visual alarm comprising a plurality of LED's positioned on an exterior surface of said conduit.

2. The device according to claim 1 wherein said alarm is an audible alarm.

3. The device according to claim 1 wherein said visual alarm is a programmable OLED sign wrapped about said conduit.

4. The device according to claim 1 wherein said source further comprises a collector connected to said smart charger that is in communication with a main power grid associated with said building.

5. The device according to claim 4 further comprising means for diverting electricity to said collector only upon said battery being fully recharged.

6. The device according to claim 1 further comprising a camera mounted on said conduit that is in wireless communication with an auxiliary monitor to allow an occupant to conveniently monitor a perimeter of said building.

7. In combination with a building having a roof with an attic below, a device for generating electricity comprising:

a turbine attic ventilator mounted on said roof, said ventilator formed of a bladed shroud with a drive shaft attached thereto, said shroud superimposed on a conduit that is mounted on a roof and which is in communication with said attic, said shroud freely rotatable by wind to remove hot air from said attic; said conduit formed of a lower, base section and a rotating upper section, said base section including a chamfered upper edge that mates with a chamfered lower edge on the upper section whereby when said upper section is rotated, an angle of said shroud relative to an angle of said roof changes, allowing a user to optimally position said shroud relative to current wind direction;

an electrical generator received within said conduit and coupled with said drive shaft whereby rotation of said shroud and said shaft generates electricity;

a source in communication with said generator for receiving electricity created thereby;

a smart-charge controller;

a rechargeable battery connected to said smart-charge controller;

an optical smoke detector within said conduit and connected to said battery;

an alarm in communication with said smoke detector for alerting a user of the presence of smoke;

wherein said alarm is a visual alarm comprising a plurality of LED's positioned on an exterior surface of said conduit.

* * * * *